US012573003B2

(12) United States Patent
Fujiwara et al.

(10) Patent No.: US 12,573,003 B2
(45) Date of Patent: Mar. 10, 2026

(54) IMAGE PROCESSING DEVICE

(71) Applicants: HONDA MOTOR CO., LTD., Tokyo (JP); AISIN CORPORATION, Aichi (JP)

(72) Inventors: Tatsuro Fujiwara, Tokyo (JP); Jumpei Morita, Tokyo (JP); Hiroki Takaku, Tokyo (JP); Kinji Yamamoto, Kariya (JP); Kazuya Watanabe, Kariya (JP)

(73) Assignees: HONDA MOTOR CO., LTD., Tokyo (JP); AISIN CORPORATION, Kariya (JP)

( * ) Notice: Subject to any disclaimer, the term of this patent is extended or adjusted under 35 U.S.C. 154(b) by 129 days.

(21) Appl. No.: 18/418,987

(22) Filed: Jan. 22, 2024

(65) Prior Publication Data

US 2024/0257311 A1 Aug. 1, 2024

(30) Foreign Application Priority Data

Jan. 27, 2023 (JP) ................................. 2023-011067

(51) Int. Cl.
*G06T 5/00* (2024.01)
*G06T 5/50* (2006.01)
*H04N 13/117* (2018.01)

(52) U.S. Cl.
CPC .............. *G06T 5/50* (2013.01); *H04N 13/117* (2018.05); *G06T 2207/20221* (2013.01); *G06T 2207/30252* (2013.01)

(58) Field of Classification Search
CPC ............. G06T 5/50; G06T 2207/20221; G06T 2207/30252; H04N 13/117; H04N 13/111;
(Continued)

(56) References Cited

U.S. PATENT DOCUMENTS

| | | | |
|---|---|---|---|
| 7,161,616 B1 | 1/2007 | Okamoto et al. | |
| 8,019,505 B2 * | 9/2011 | Schofield ................... | B60R 1/12 |
| | | | 340/438 |

(Continued)

FOREIGN PATENT DOCUMENTS

| | | |
|---|---|---|
| JP | 3300334 B2 | 7/2002 |
| JP | 2014-068308 A | 4/2014 |

(Continued)

*Primary Examiner* — Sarah Lhymn
(74) *Attorney, Agent, or Firm* — Rankin, Hill & Clark LLP

(57) ABSTRACT

An image processing device includes: a processor configured to generate a surrounding image when a vehicle is viewed from a virtual viewpoint, based on captured images, generate a composite image in which a vehicle image showing the vehicle when viewed from the virtual viewpoint is combined with the surrounding image, and display the composite image on a display device. The processor is configured to: perform a first control for displaying the composite image on the display device while rotationally moving the virtual viewpoint with respect to the vehicle in a predetermined pattern, and a second control for displaying the composite image on the display device while moving the virtual viewpoint to a position according to an operation of an operation unit of the vehicle; and change a transmittance of the vehicle image when performing the first control and when performing the second control.

7 Claims, 10 Drawing Sheets

(58) Field of Classification Search
CPC ...... H04N 5/2628; H04N 5/265; H04N 7/185;
B60R 2300/607; B60R 1/28; B60R 1/27;
B60R 1/22; B60R 2300/304
See application file for complete search history.

(56) References Cited

U.S. PATENT DOCUMENTS

| | | | |
|---|---|---|---|
| 2010/0245573 A1* | 9/2010 | Gomi | H04N 7/181 |
| | | | 348/148 |
| 2011/0043632 A1* | 2/2011 | Satoh | B60R 1/24 |
| | | | 348/E7.083 |
| 2012/0069188 A1 | 3/2012 | Ohno et al. | |
| 2012/0113261 A1* | 5/2012 | Satoh | G06T 19/00 |
| | | | 348/148 |
| 2012/0249789 A1* | 10/2012 | Satoh | B60R 1/26 |
| | | | 348/143 |
| 2014/0085466 A1 | 3/2014 | Moriyama et al. | |
| 2015/0262488 A1 | 9/2015 | Ohno et al. | |
| 2018/0191960 A1 | 7/2018 | Hatakeyama et al. | |
| 2019/0077368 A1* | 3/2019 | Hwang | B60R 25/24 |
| 2020/0167996 A1* | 5/2020 | Watanabe | B60R 1/28 |
| 2021/0287445 A1* | 9/2021 | Sato | H04N 23/63 |
| 2022/0185183 A1* | 6/2022 | Kida | B60R 1/27 |
| 2023/0360187 A1* | 11/2023 | Bugovics | G06T 7/73 |

FOREIGN PATENT DOCUMENTS

| | | |
|---|---|---|
| JP | 2014-197817 A | 10/2014 |
| JP | 5627253 B2 | 11/2014 |
| JP | 2018-110328 A | 7/2018 |

* cited by examiner

IMAGE PROCESSING DEVICE

CROSS-REFERENCE RELATED APPLICATIONS

This application is based on and claims priority under 35 USC 119 from Japanese Patent Application No. 2023-011067 filed on Jan. 27, 2023, the contents of which are incorporated herein by reference.

TECHNICAL FIELD

The present disclosure relates to an image processing device.

BACKGROUND ART

In recent years, efforts have become active to provide access to sustainable transport systems that consider the most vulnerable people among transport participants. Therefore, the applicant is focusing on research and development to further improve traffic safety and convenience through research and development on an active safety technology.

For example, Japanese Patent Publication No. 3300334 (hereinafter, referred to as Patent Literature 1), Japanese Patent Publication No. 5627253 (hereinafter, referred to as Patent Literature 2), Japanese Patent Application Laid-Open Publication No. 2014-197817 (hereinafter, referred to as Patent Literature 3), Japanese Patent Application Laid-Open Publication No. 2014-68308 (hereinafter, referred to as Patent Literature 4) and Japanese Patent Application Laid-Open Publication No. 2018-110328 (hereinafter, referred to as Patent Literature 5) disclose technology as active safety technology that supports understanding of a surrounding situation of a vehicle.

Patent Literature 1 describes changing a display transmittance of a vehicle in technology that receives images captured by a plurality of cameras capturing surroundings of the vehicle and generates a composite image viewed from a virtual viewpoint from the camera images.

Patent Literature 2 describes that a first composite image is generated that looks in a vehicle direction from a virtual viewpoint based on a plurality of images obtained from a plurality of cameras capturing surroundings of a vehicle, and a plurality of the first composite images generated by changing a position of the virtual viewpoint step by step to orbit around the vehicle are successively output to a display device.

Patent Literature 3 describes that a plurality of captured images taken by a plurality of cameras placed at different positions on a vehicle are used to generate and display a virtual viewpoint image showing surroundings of the vehicle as seen from a continuously changing virtual viewpoint.

Patent Literature 4 describes that in technology that generates a surrounding image of a vehicle and a surrounding area thereof viewed from a virtual viewpoint from images taken by a camera mounted on the vehicle, and generates a composite image in which a vehicle image representing the vehicle is superimposed on the surrounding image, the vehicle image is represented by a linear frame with a frame of a vehicle body, and a part of the frame of the vehicle body is hidden.

Patent Literature 5 describes an image processing device which includes an information obtaining unit that obtains information regarding detected positions of obstacles existing around a vehicle, a generation unit that generates a virtual viewpoint image of surroundings of the vehicle from a virtual viewpoint based on a captured image of the surroundings of the vehicle, a synthesizing unit that synthesizes a notification image that notifies presence of the obstacle at the detected position in the virtual viewpoint image, and synthesizes a vehicle image with the virtual viewpoint image. In the image processing device, at least a part of the notification image or vehicle image is transparent.

When combining a vehicle image with an image viewed from a virtual viewpoint, it is considered effective to increase the transmittance of the vehicle image, as in Patent Literatures 4 and 5.

However, depending on the purpose, it may be good to have a clearly visible vehicle image.

The present disclosure provides technology that appropriately controls a display format of a vehicle image when combining the vehicle image with an image seen from a virtual viewpoint and displaying the composite image, allowing accurate understanding of a surrounding situation of a vehicle. The technology contributes to development of sustainable transportation systems.

SUMMARY

An aspect of the present disclosure relates to an image processing device including: a processor configured to generate a surrounding image that is an image of surroundings of a vehicle when the vehicle is viewed from a virtual viewpoint, based on captured images obtained from an imaging device installed in the vehicle, generate a composite image in which a vehicle image showing the vehicle when viewed from the virtual viewpoint is combined with the surrounding image, and display the composite image on a display device. The processor is configured to: perform a first control for displaying the composite image on the display device while rotationally moving the virtual viewpoint with respect to the vehicle in a predetermined pattern, and a second control for displaying the composite image on the display device while moving the virtual viewpoint to a position according to an operation of an operation unit of the vehicle; and change a transmittance of the vehicle image when performing the first control and when performing the second control.

BRIEF DESCRIPTION OF DRAWINGS

Exemplary embodiments of the present disclosure will be described in detail based on the following figures, wherein.

DESCRIPTION OF EMBODIMENTS

Figure 1:
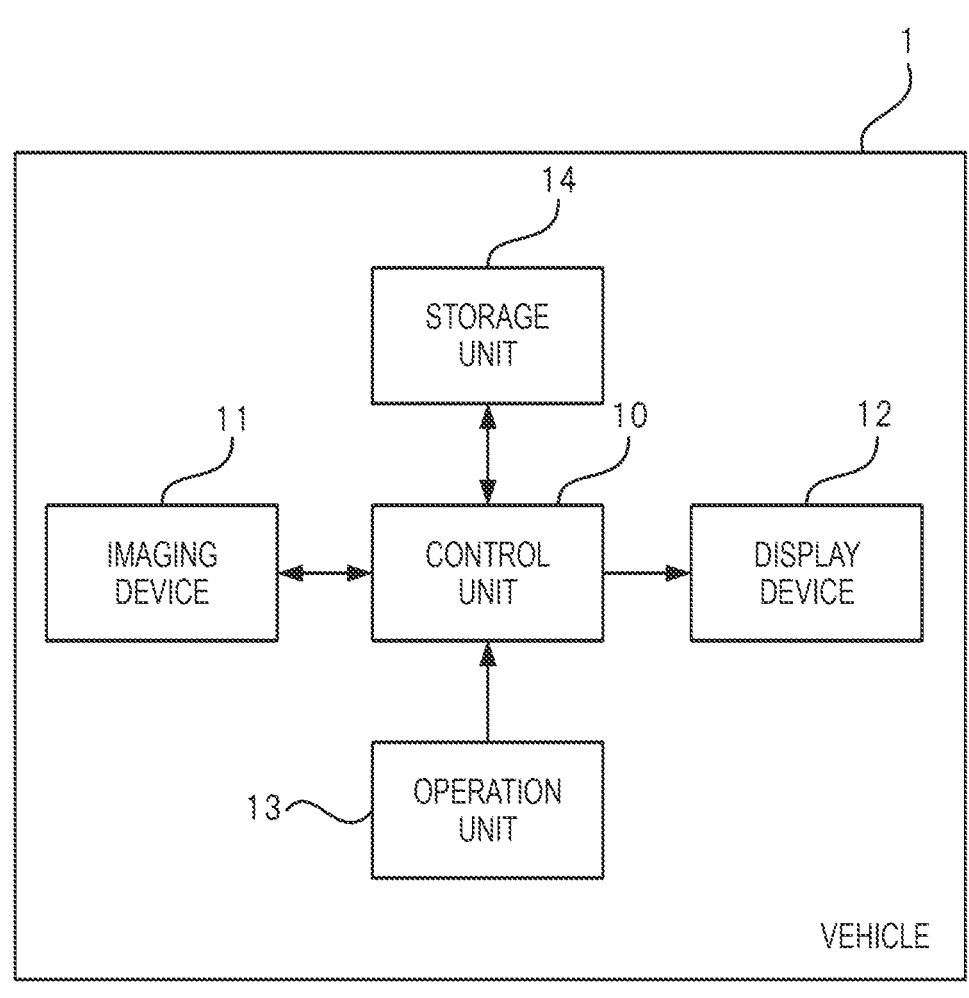
FIG. 1 is a diagram illustrating a vehicle equipped with an image processing device according to an embodiment of the present disclosure.

FIG. 1 is a diagram illustrating a vehicle 1 equipped with an image processing device according to an embodiment of the present disclosure. The vehicle 1 illustrated in FIG. 1 is an automobile that includes a drive source and wheels (not illustrated) including drive wheels driven by power of the drive source and steerable wheels.

For example, the vehicle 1 is a four-wheeled automobile including a pair of left and right front wheels and a pair of left and right rear wheels. The drive source of the vehicle 1 may be an electric motor, an internal combustion engine such as a gasoline engine or a diesel engine, or a combination of an electric motor and an internal combustion engine. The drive source of the vehicle 1 may drive the pair of left and right front wheels, the pair of left and right rear wheels, or four wheels of the pairs of left and right front wheels and left and right rear wheels. Either one of the front wheels and the rear wheels may be steerable wheels, or both may be steerable wheels.

The vehicle 1 includes a control unit 10, an imaging device 11, a display device 12, an operation unit 13, and a storage unit 14.

The imaging device 11 includes one or more digital cameras, and is controlled by the control unit 10. The imaging device 11 includes, for example, a front camera that images a front of the vehicle 1, a rear camera that images a rear of the vehicle 1, a left side camera that images a left side of the vehicle 1, and a right side camera that images a right side of the vehicle 1. The imaging device 11 outputs image data of images obtained by imaging surroundings of the vehicle 1 by the cameras to the control unit 10.

The display device 12 is configured by, for example, a display such as an organic electro-luminescence (EL) display or a liquid crystal display, and is controlled by the control unit 10.

The operation unit 13 is input means such as keys and buttons that accept input from a user who is a passenger of the vehicle 1, a touch panel mounted on the display device 12, and the like, and accepts various operations from the user. The operation unit 13 includes a member for starting the vehicle 1 (an ignition switch and a start button), a member for fixing the vehicle 1 (a shift lever and a parking brake), and the like.

The storage unit 14 includes a work memory such as a random access memory (RAM) and a non-temporary storage medium such as a flash memory. The storage unit 14 stores programs for the control unit 10 to perform various processes.

The control unit 10 is configured of a processor that executes software (programs) to perform various functions. As a processor, a central processing unit (CPU) which is a general-purpose processor, a programmable logic device (PLD) such as a field programmable gate array (FPGA) which is a processor of which a circuit configuration can be changed after manufacturing, a dedicated electric circuit such as an application specific integrated circuit (ASIC) which is a processor having a circuit configuration specifically designed to execute a certain processing, or the like can be used. The control unit 10 may be configured with one processor, or may be configured with a combination of two or more processors of the same type or different types (for example, a plurality of FPGAs or a combination of a CPU and an FPGA). The control unit 10 and the storage section 14 form an image processing device.

<Display Control>

The control unit 10 executes coordinate transformation on the image obtained from the imaging device 11 and generates a surrounding image that is an image of the surroundings of the vehicle 1 when the vehicle 1 is viewed from a virtual viewpoint. The control unit generates a composite image by combining the surrounding image with a vehicle image that is an image of the vehicle 1 when the vehicle 1 is viewed from the virtual viewpoint, and performs control to display the composite image on the display device 12.

The control unit 10 sets a vehicle external viewpoint V1 outside the vehicle 1 and a vehicle internal viewpoint V2 inside the vehicle 1 as virtual viewpoints. The vehicle external viewpoint V1 and the vehicle internal viewpoint V2 can each take a plurality of positions.

<Vehicle External Viewpoint>

Figure 2:
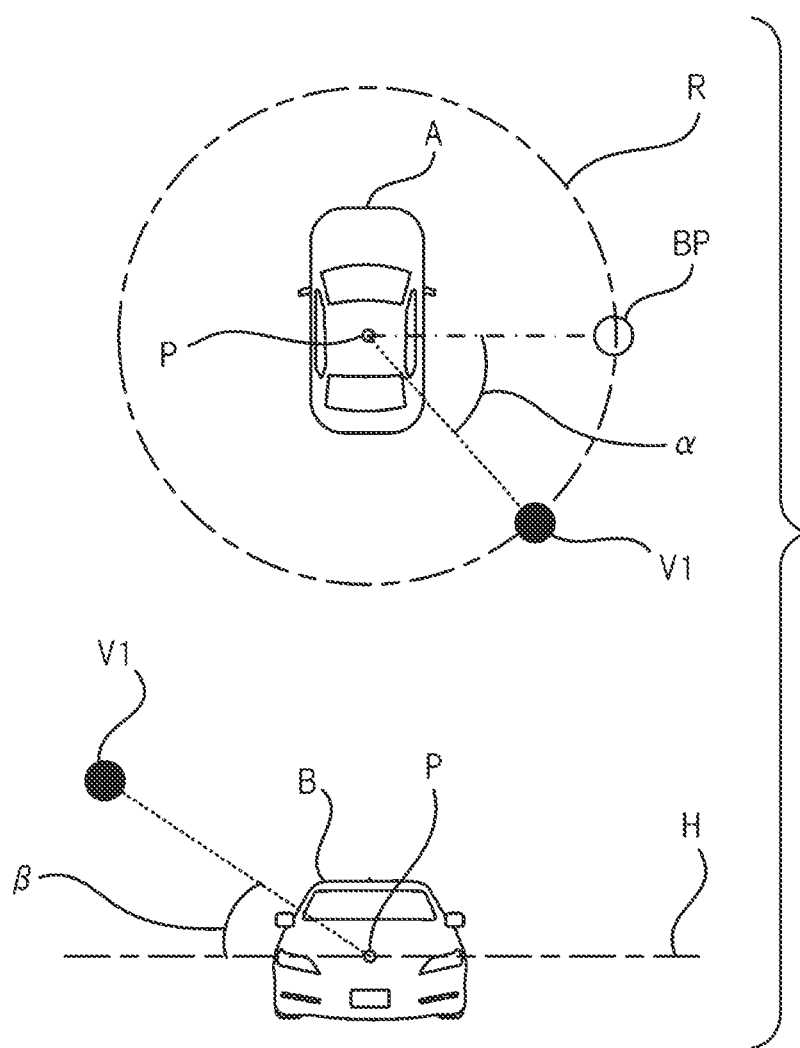
FIG. 2 is a schematic diagram illustrating a vehicle external viewpoint.

FIG. 2 is a schematic diagram illustrating the vehicle external viewpoint V1. FIG. 2 illustrates an image A corresponding to the vehicle 1 when viewed from above, and an image B corresponding to the vehicle 1 when viewed from the front. In the images A and B, a reference point P set at an arbitrary position in the three-dimensional coordinates of the vehicle 1 is shown. In the example of FIG. 2, the reference point P is set at approximately the center of the vehicle 1 in a front-rear direction and approximately the center of the vehicle 1 in a height direction.

A circle R centered on the reference point P is shown around the image A. The vehicle external viewpoint V1 is set on the circle R. In the example of FIG. 2, the vehicle external viewpoint V1 is located at the right rear side of the vehicle 1. FIG. 2 shows an imaginary line H extending in a width direction (left-right direction) of the vehicle 1 and passing through the reference point P. The vehicle exterior viewpoint V1 is set above the imaginary line H, and is set at a position where an angle formed between the imaginary line H and a straight line connecting the vehicle exterior viewpoint V1 and the reference point P is 0 degrees or more and less than 90 degrees. As such, the vehicle exterior viewpoint V1 is set at a position where a direction in which the straight line connecting the reference point P set on the vehicle 1 and the vehicle exterior viewpoint V1 extends does not match the height direction of the vehicle 1.

On the circle R, an arbitrary reference viewpoint BP is set at a position on the right side of the vehicle 1 in the example of FIG. 2. An angle formed between a straight line connecting the reference viewpoint BP and the reference point P and the straight line connecting the vehicle external viewpoint V1 and the reference point P is described as an azimuth angle $\alpha$. An angle formed between the imaginary line H and the straight line connecting the external viewpoint V1 and the reference point P is referred to as an elevation angle $\beta$. The azimuth angle $\alpha$ and the elevation angle $\beta$ can each be changed, and the position of the vehicle external viewpoint V1 is determined by the combination of the azimuth angle $\alpha$ in a range of 0 degrees to 360 degrees and the elevation angle $\beta$ in a range of 0 degrees to 90 degrees.

The possible range of the azimuth angle $\alpha$ may be narrower than the range from 0 degrees to 360 degrees. Similarly, the possible range of the elevation angle $\beta$ may be narrower than the range from 0 degrees to 90 degrees.

Figure 3:
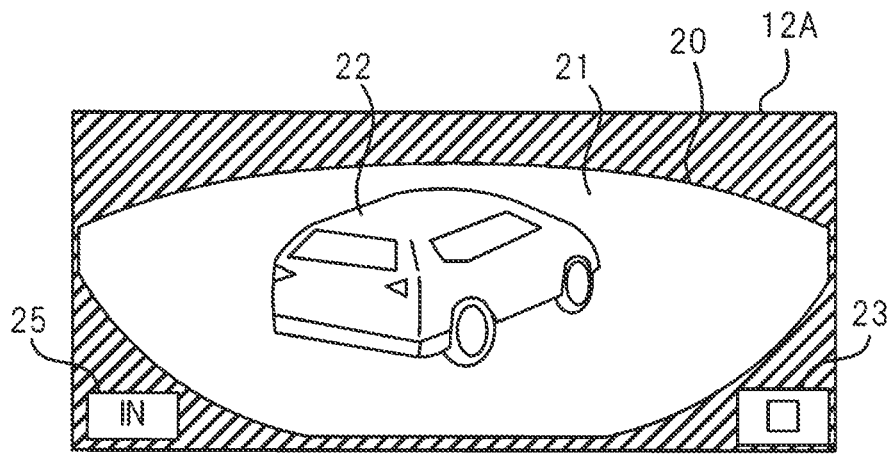
FIG. 3 is a diagram illustrating a display example of a composite image generated when the vehicle external viewpoint is set at a position shown in FIG. 2.

FIG. 3 is a diagram illustrating a display example of a composite image generated when the vehicle external viewpoint V1 is set at the position shown in FIG. 2. A screen 12A of the display device 12 includes a composite image 20. The composite image 20 includes a vehicle image 22 showing the vehicle 1 when the vehicle 1 is viewed from the right rear side, and a surrounding image 21 of the surroundings of the vehicle 1.

Figure 4:
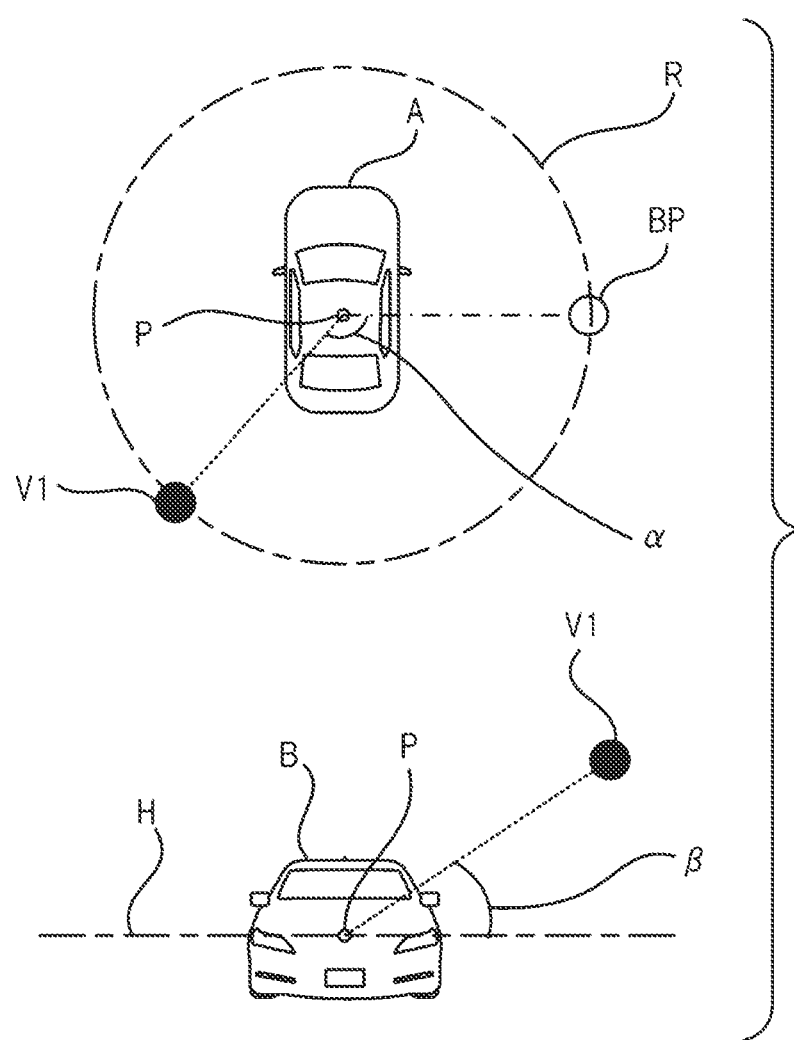
FIG. 4 is a schematic diagram illustrating a state in which the vehicle external viewpoint is set at a position different from that in FIG. 2.

FIG. 4 is a schematic diagram illustrating a state in which the vehicle external viewpoint V1 is set at a position different from that in FIG. 2. The vehicle external viewpoint V1 shown in FIG. 4 has the same elevation angle β as that in FIG. 2, but the azimuth angle α is larger than that in FIG. 2, and is set to the left rear side of the vehicle 1.

Figure 5:
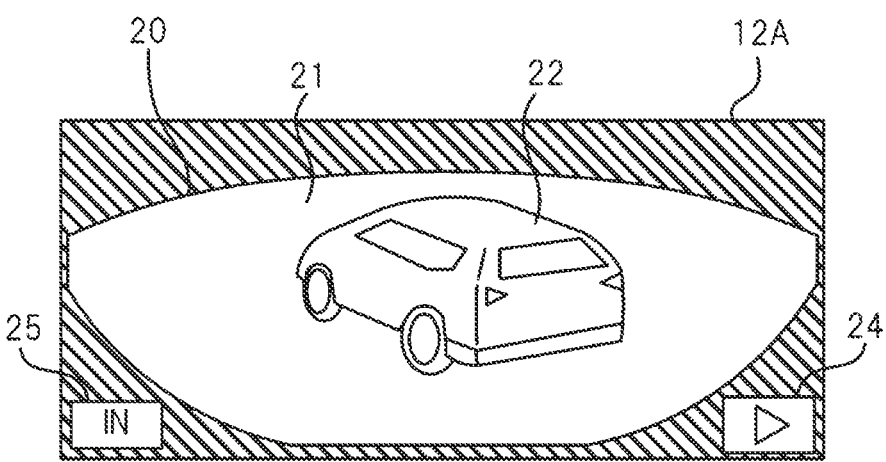
FIG. 5 is a diagram illustrating a display example of a composite image generated when the vehicle external viewpoint is set at the position shown in FIG. 4.

FIG. 5 is a diagram illustrating a display example of a composite image generated when the vehicle external viewpoint V1 is set at the position shown in FIG. 4. The composite image 20 shown in FIG. 5 is obtained by rotating the composite image 20 shown in FIG. 3 counterclockwise around the vehicle image 22. As such, by changing the azimuth angle α of the vehicle external viewpoint V1, the composite image 20 can be rotated and displayed in a direction along the periphery of the vehicle 1.

<Vehicle Internal Viewpoint>

Figure 6:
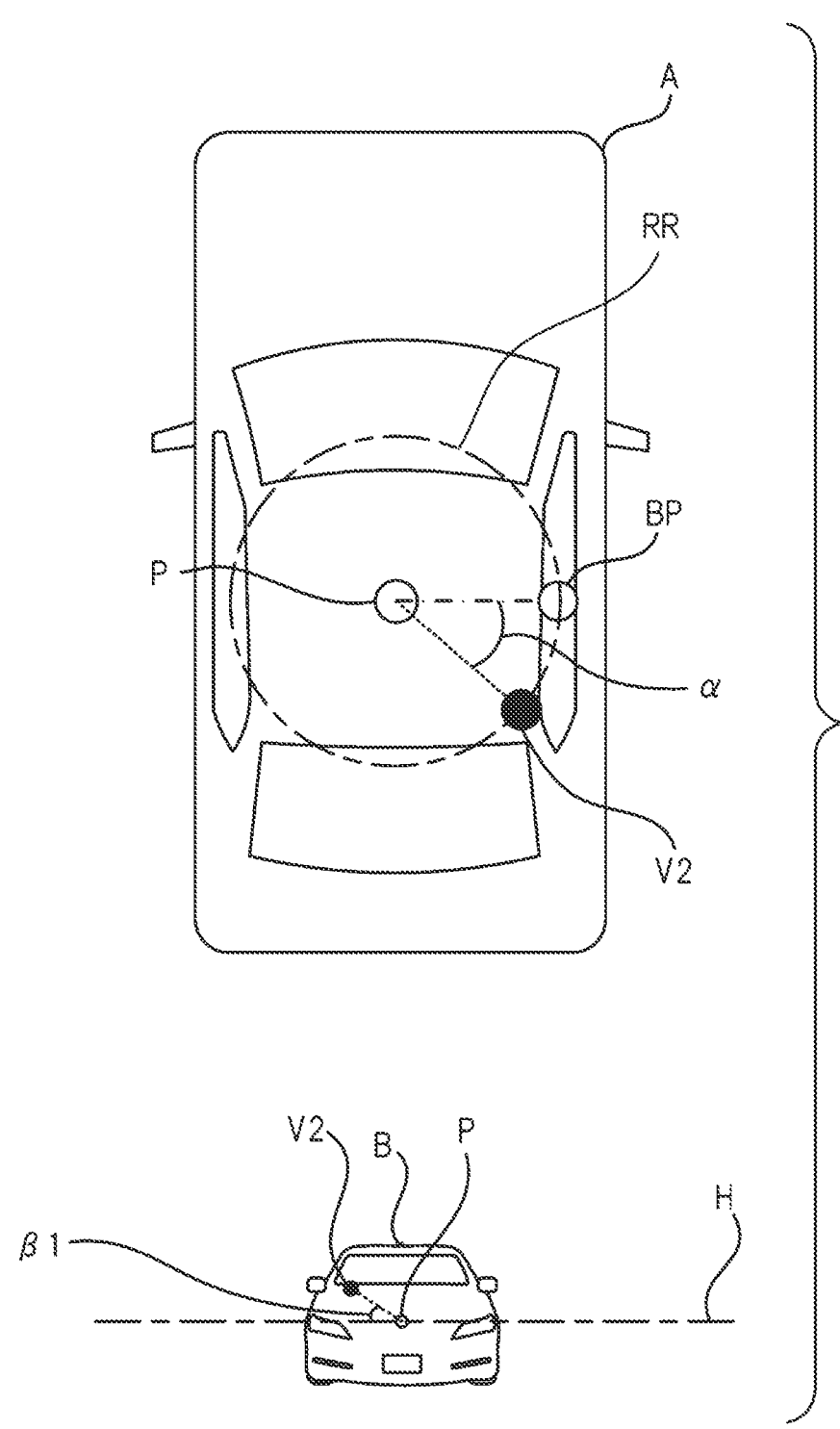
FIG. 6 is a schematic diagram illustrating a vehicle internal viewpoint.

FIG. 6 is a schematic diagram illustrating the vehicle internal viewpoint V2. FIG. 6 shows the same image A, image B, and reference point P as described above.

In the image A, a circle RR centered on the reference point P is shown. The circle RR has a smaller radius than the circle R and is set inside the image A. The vehicle internal viewpoint V2 is set on the circle RR. In the example of FIG. 6, the vehicle internal viewpoint V2 is located to the right rear side of the reference point P.

FIG. 6 shows the imaginary line H described above. The vehicle internal viewpoint V2 is set above the imaginary line H, and is set at a position where an angle formed between the imaginary line H and a straight line connecting the vehicle internal viewpoint V2 and the reference point P is 0 degrees or more and less than 90 degrees. As such, the vehicle internal viewpoint V2 is set at a position where a direction in which the straight line connecting the reference point P set on the vehicle 1 and the vehicle internal viewpoint V2 extends does not match the height direction of the vehicle 1.

In the circle RR, the arbitrary reference viewpoint BP is set at a position to the right side of the reference point P in the example of FIG. 6. An angle formed between a straight line connecting the reference viewpoint BP and the reference point P and the straight line connecting the vehicle internal viewpoint V2 and the reference point P is the same as the azimuth angle α described above. An angle formed between the straight line connecting the vehicle internal viewpoint V2 and the reference point P and the imaginary line H is described as an elevation angle β1. The elevation angle β1 is an arbitrary value within a range of angles that the elevation angle β can take, and is a fixed value.

Figure 7:
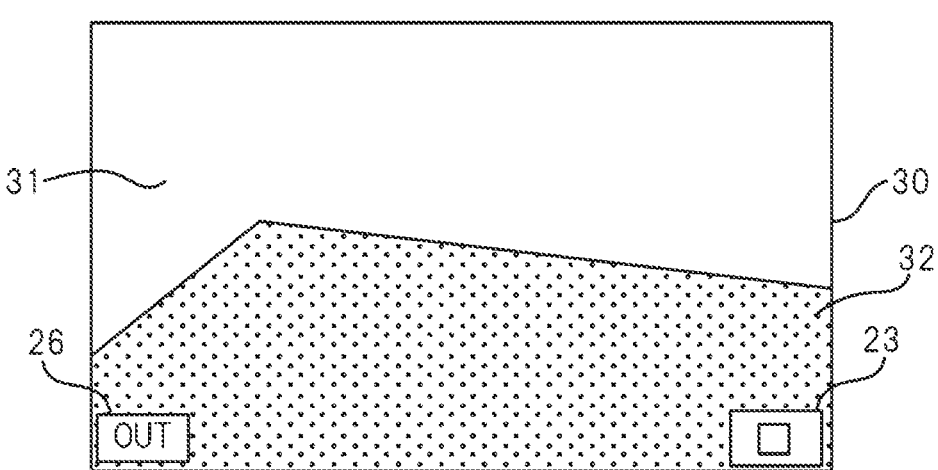
FIG. 7 is a diagram illustrating a display example of a composite image generated when the vehicle internal viewpoint is set at a position shown in FIG. 6.

FIG. 7 is a diagram illustrating a display example of a composite image generated when the vehicle internal viewpoint V2 is set at the position shown in FIG. 6. A composite image 30 shown in FIG. 7 includes a surrounding image 31 around the vehicle 1 when looking from inside the vehicle 1 to the left front side, and a vehicle image 32 showing a part of the vehicle 1.

Figure 8:
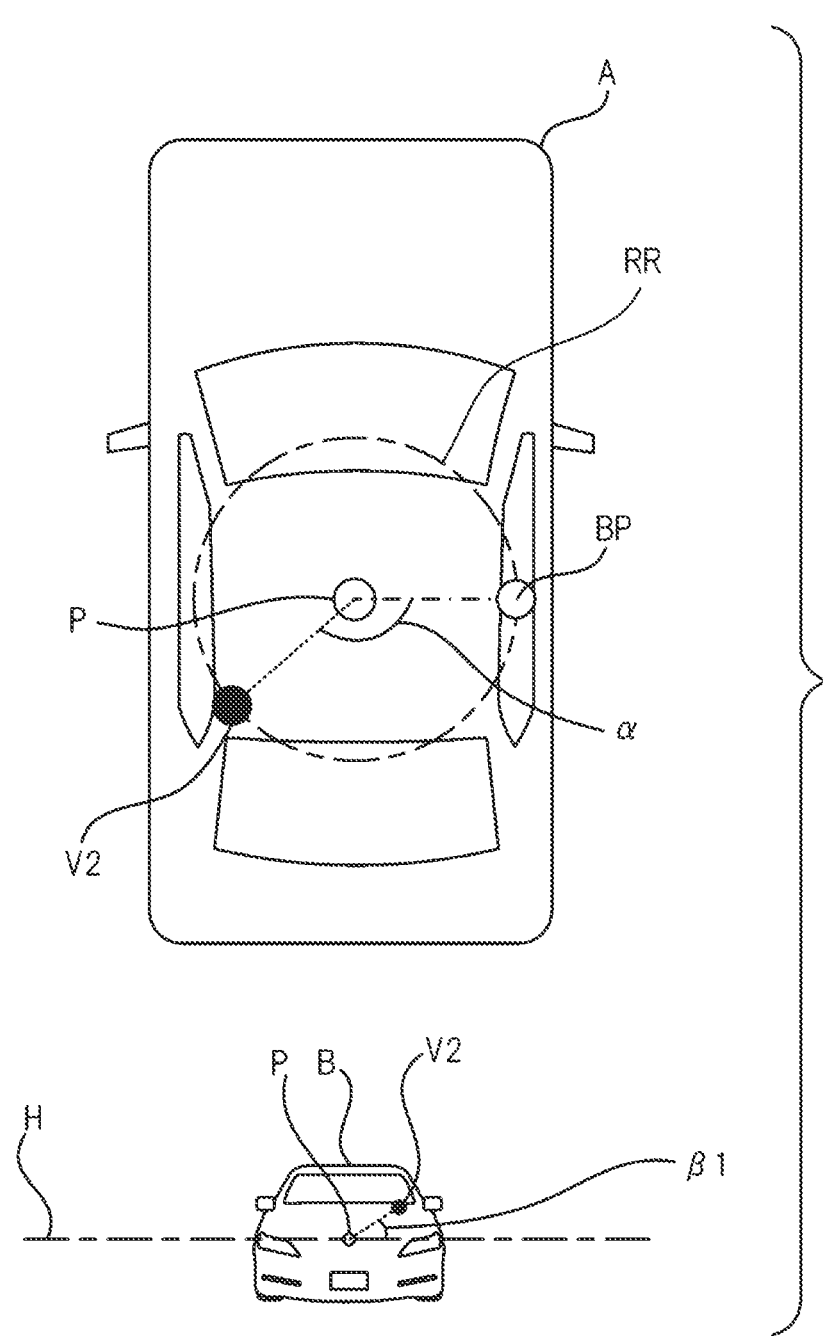
FIG. 8 is a schematic diagram illustrating a state in which the vehicle internal viewpoint is set at a position different from that in FIG. 6.

FIG. 8 is a schematic diagram illustrating a state in which the vehicle internal viewpoint V2 is set at a position different from that in FIG. 6. The vehicle internal viewpoint V2 shown in FIG. 8 has the same elevation angle β1 as that in FIG. 6, but the azimuth angle α is larger than that in FIG. 6, and is set to the left rear side of the reference point P.

Figure 9:
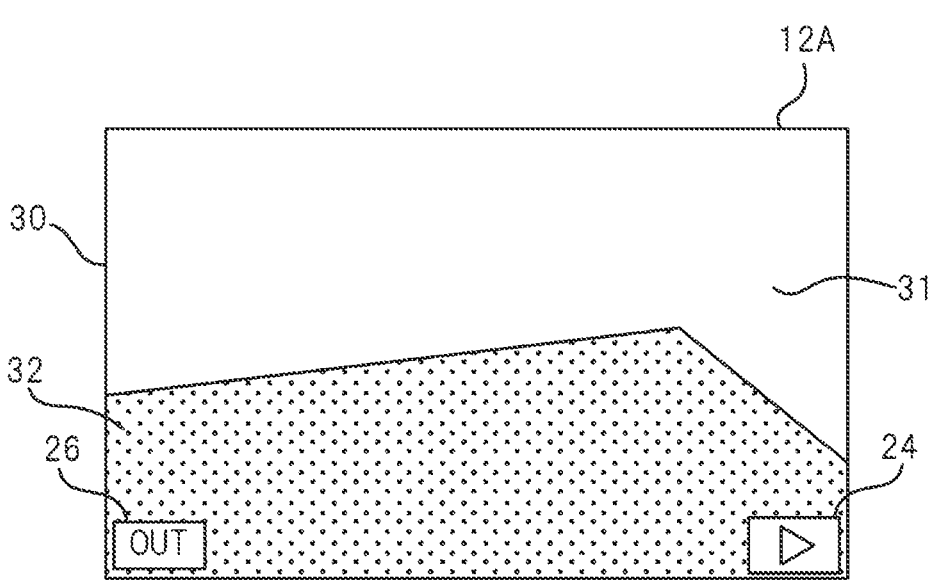
FIG. 9 is a diagram illustrating a display example of a composite image generated when the vehicle internal viewpoint shown in FIG. 8 is set.

FIG. 9 is a diagram illustrating a display example of a composite image generated when the vehicle internal viewpoint V2 shown in FIG. 8 is set. The composite image 30 shown in FIG. 9 is obtained by rotating the composite image 30 shown in FIG. 7 counterclockwise around the vehicle image 32. As such, by changing the azimuth angle α of the vehicle internal viewpoint V2, the composite image 30 can be rotated and displayed in a direction along the periphery of the vehicle 1.

<Automatic Rotation Control>

The control unit 10 performs automatic vehicle external rotation control for rotating and moving the vehicle external viewpoint V1 in a predetermined pattern and sequentially displaying the composite image 20 generated with the vehicle external viewpoint V1 at each position on the display device 12, and automatic vehicle internal rotation control for rotating and moving the vehicle internal viewpoint V2 in a predetermined pattern and sequentially displaying the composite image 30 generated with the vehicle internal viewpoint V2 at each position on the display device 12.

The above-described pattern is, for example, control in which the azimuth angle α is increased by a unit angle while the elevation angle β or the elevation angle β1 is maintained constant. As such, the automatic vehicle external rotation control and the automatic vehicle internal rotation control each move the virtual viewpoint in a predetermined pattern regardless of the user's intention, and automatically rotate and display the composite image. The automatic vehicle external rotation control and the automatic vehicle internal rotation control are collectively referred to as automatic rotation control.

<Manual Rotation Control>

The control unit 10 performs manual vehicle external rotation control for moving the vehicle external viewpoint V1 to a position according to the operation of the operation unit 13 and displaying the generated composite image 20 on the display device 12 while the vehicle external viewpoint V1 is at the position after movement, and manual vehicle internal rotation control for moving the vehicle internal viewpoint V2 to a position according to the operation of the operation unit 13 and displaying the generated composite image 30 on the display device 12 while the vehicle internal viewpoint V2 is at the position after movement. The manual vehicle external rotation control and the manual vehicle internal rotation control are collectively referred to as manual rotation control.

In the vehicle 1, for example, the user can instruct the control unit 10 to increase or decrease the azimuth angle α by moving a finger from side to side while touching the touch panel mounted on the display device 12. For example, the user can instruct the control unit 10 to increase or decrease the elevation angle β by moving a finger that is in contact with the touch panel up and down.

In manual vehicle external rotation control, the control unit 10 obtains the azimuth angle α and elevation angle β instructed by the user as described above, sets the vehicle external viewpoint V1 at a position determined by the obtained azimuth angle α and elevation angle β to generate the composite image 20, and displays the composite image 20 on the display device 12. As a result, the vehicle external viewpoint V1 moves according to the user's operation, so that the composite image 20 can be displayed on the display device 12 from the user's desired viewpoint.

In manual vehicle internal rotation control, the control unit 10 obtains the azimuth angle α instructed by the user as described above, sets the vehicle internal viewpoint V2 at a position determined by the obtained azimuth angle α and the elevation angle β1 (predetermined value) to generate the composite image 30, and displays the composite image 30 on the display device 12. As a result, the vehicle internal viewpoint V2 moves according to the user's operation, so that the composite image 30 can be displayed on the display device 12 from the user's desired viewpoint.

<Setting Vehicle Image Transmittance>

When performing manual vehicle external rotation control, the control unit 10 sets a transmittance of the vehicle image 22 in the composite image 20 to a first transmittance. When performing automatic vehicle external rotation control, the control unit 10 sets the transmittance of the vehicle image 22 in the composite image 20 to a second transmittance higher than the first transmittance.

The first transmittance is, for example, 0%, and the second transmittance is, for example, 50% to 90%, but the first and second transmittances are not limited thereto. The second transmittance may be set to a value such that when the vehicle 1 is viewed from the vehicle external viewpoint V1, a place hidden by the vehicle 1 can be sufficiently recognized through the vehicle image 22. The first transmittance may be set to a value that allows a positional relationship between the vehicle 1 and surrounding objects to be clearly understood when the vehicle 1 is viewed from the vehicle external viewpoint V1.

The control unit 10 sets the transmittance of the vehicle image 32 in the composite image 30 to a third transmittance higher than the first transmittance when performing either the automatic vehicle internal rotation control or the manual vehicle internal rotation control. The third transmittance is preferably the same value as the second transmittance. The third transmittance is, for example, 50% to 90%, but is not limited thereto. The third transmittance may be set to a value that allows a place hidden by the vehicle 1 to be sufficiently recognized through the vehicle image 22 when looking outside the vehicle 1 from the vehicle internal viewpoint V2.

When displaying the composite image 20 and composite image 30 on the display device 12, the control unit 10 causes the display device 12 to display an operation button 25 (see FIGS. 3 and 5) for switching the virtual viewpoint from the vehicle external viewpoint V1 to the vehicle internal viewpoint V2, and an operation button 26 (see FIGS. 7 and 9) for switching the virtual viewpoint from the vehicle internal viewpoint V2 to the vehicle external viewpoint V1.

When the user operates the operation button 25, the control unit 10 switches the virtual viewpoint from the vehicle external viewpoint V1 to the vehicle internal viewpoint V2. When the user operates the operation button 26, the control unit 10 switches the virtual viewpoint from the vehicle internal viewpoint V2 to the vehicle external viewpoint V1.

While the automatic rotation control is being performed, the control unit 10 causes the display device 12 to display an operation button 23 (see FIGS. 3 and 7) for switching from automatic rotation control to manual rotation control. When the user operates the operation button 23, the control unit 10 ends automatic rotation control and starts manual rotation control.

While the manual rotation control is being performed, the control unit 10 causes the display device 12 to display an operation button 24 (see FIGS. 5 and 9) for switching from manual rotation control to automatic rotation control. When the user operates the operation button 24, the control unit 10 ends manual rotation control and starts automatic rotation control.

<Control Unit Operation>

Figure 10:
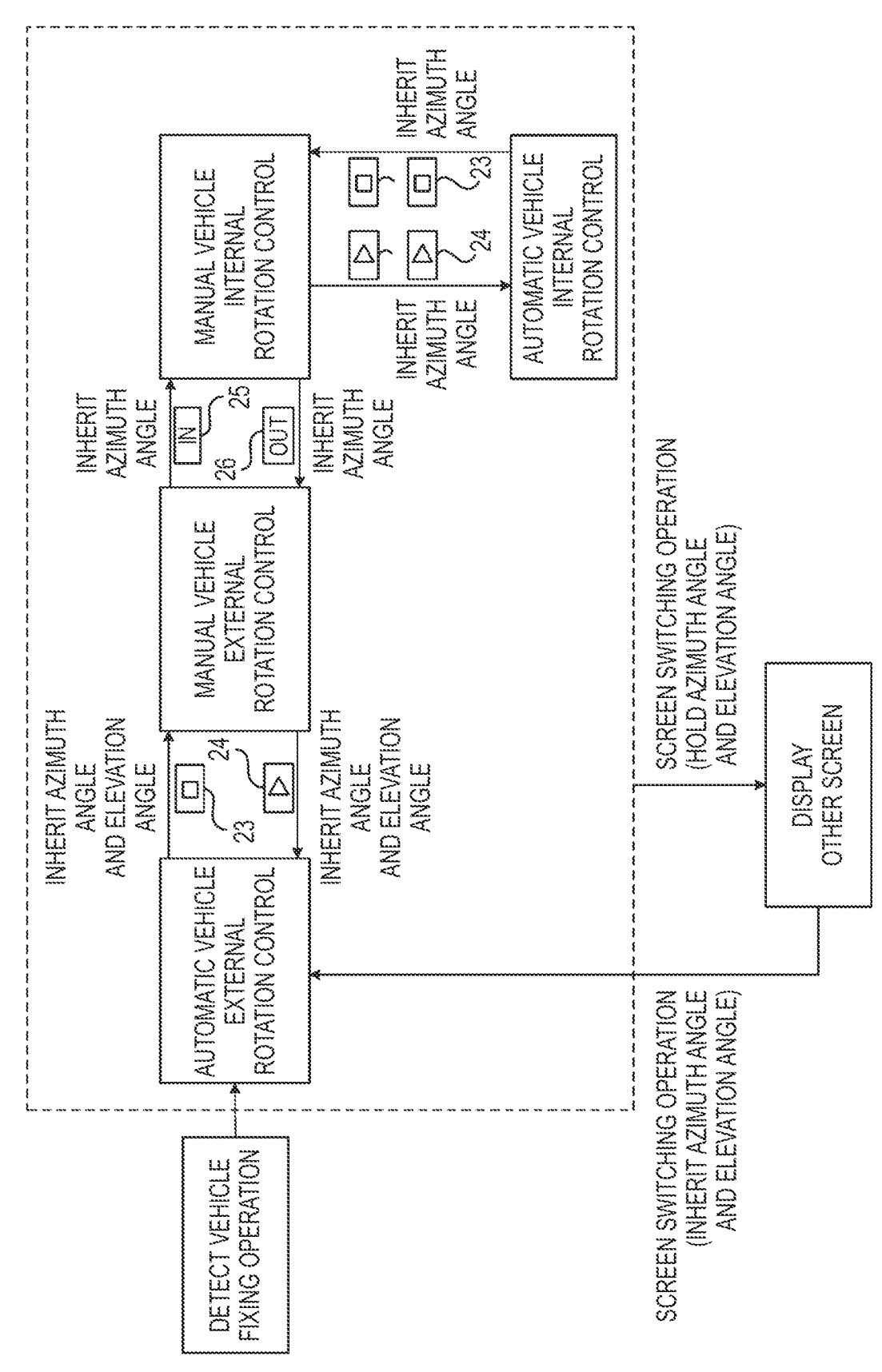
FIG. 10 is a schematic diagram illustrating an operation of a control unit.

FIG. 10 is a schematic diagram illustrating an operation of the control unit 10. When the control unit 10 detects an operation to fix the vehicle 1 (for example, an operation to put a shift lever into a parking position, an operation to apply a parking brake, or the like), the control unit 10 starts automatic vehicle external rotation control using the detection as a trigger. When the control is the first automatic vehicle external rotation control after starting the vehicle 1, the control unit 10 sets the azimuth angle α and elevation angle β to predetermined values, and then changes the azimuth angle α from the predetermined value while keeping the elevation angle β constant, such that the control unit 10 rotates and displays the composite image 20.

When the control unit 10 detects the operation of the operation button 23 while performing automatic vehicle external rotation control, the control unit 10 ends the automatic vehicle external rotation control, stores and holds setting information of the azimuth angle α and the elevation angle β set at the moment in the storage unit 14, and starts the manual vehicle external rotation control. In the manual vehicle external rotation control that starts here, the control unit 10 inherits the azimuth angle α and elevation angle β held immediately before, sets the vehicle internal viewpoint V2 at the position determined by the azimuth angle α and the elevation angle β, and displays the composite image 30. Then, when the user performs an operation, the display of the composite image 30 is updated by changing the azimuth angle α and the elevation angle β starting from the inherited values according to the user's operation.

When the control unit 10 detects an operation of the operation button 24 while performing manual vehicle external rotation control, the control unit 10 ends the manual vehicle external rotation control, stores and holds the setting information of the azimuth angle α and elevation angle β set at the moment in the storage unit 14, and starts the automatic vehicle external rotation control. In the automatic vehicle external rotation control that starts here, the control unit 10 inherits the azimuth angle α and elevation angle β held immediately before, sets the vehicle external viewpoint V1 at the position determined by the azimuth angle α and the elevation angle β, and then from the inherited value, the azimuth angle α is changed, such that the control unit 10 rotates and displays the composite image 20.

When the control unit 10 detects the operation of the operation button 25 while performing manual vehicle external rotation control, the control unit 10 ends the manual vehicle external rotation control, stores and holds the setting information of the azimuth angle α and elevation angle β set at the moment in the storage unit 14, and starts the manual vehicle internal rotation control. In the manual vehicle internal rotation control that starts here, the control unit 10 inherits the azimuth angle α held immediately before, sets the vehicle internal viewpoint V2 at a position determined by the azimuth angle α and the elevation angle β1, and displays the composite image 30. Then, when the user performs an operation, the display of the composite image 30 is updated by changing the azimuth angle α starting from the inherited value according to the user's operation.

When the control unit 10 detects the operation of the operation button 24 while performing manual vehicle internal rotation control, the control unit 10 ends the manual vehicle internal rotation control, stores and holds setting information of the azimuth angle α set at the moment in the storage unit 14, and starts the automatic vehicle internal rotation control. In the automatic vehicle internal rotation control that starts here, the control unit 10 inherits the azimuth angle α held immediately before, sets the vehicle internal viewpoint V2 at the position determined by the azimuth angle α and the elevation angle β1, and then from the inherited value, the azimuth angle α is changed, such that the control unit 10 rotates and displays the composite image 30.

When the control unit 10 detects the operation of the operation button 23 while performing automatic vehicle internal rotation control, the control unit 10 ends the automatic vehicle internal rotation control, stores and holds the setting information of the azimuth angle α set at the moment in the storage unit 14, and starts the manual vehicle internal rotation control. In the manual vehicle internal rotation control that starts here, the control unit 10 inherits the azimuth angle α held immediately before, sets the vehicle internal viewpoint V2 at a position determined by the azimuth angle α and the elevation angle β1, and displays the composite image 30. Then, when the user performs an operation, the display of the composite image 30 is updated by changing the azimuth angle α starting from the inherited value in accordance with the user's operation.

When the control unit 10 detects the operation of the operation button 26 while performing manual vehicle internal rotation control, the control unit 10 ends the manual vehicle internal rotation control, stores and holds the setting information of the azimuth angle α set at the moment in the storage unit 14, and starts the manual vehicle external rotation control. In the manual vehicle external rotation control that starts here, the control unit 10 inherits the azimuth angle α held immediately before, and further inherits the elevation angle R held at the end of the most recent manual vehicle external rotation control. Then, the control unit 10 sets the vehicle external viewpoint V1 at a position determined by the azimuth angle α and the elevation angle β, and displays the composite image 20. Then, when the user performs an operation, the display of the composite image 20 is updated by changing the azimuth angle α and the elevation angle β starting from the inherited values according to the user's operation.

When the control unit 10 detects an operation of switching to a screen other than the screen displaying the composite image while performing any of automatic vehicle external rotation control, manual vehicle external rotation control, automatic vehicle internal rotation control, and manual vehicle internal rotation control, the control unit 10 causes the display device 12 to display the other screen.

When the control unit 10 detects the above-described operation while performing automatic vehicle external rotation control or manual vehicle external rotation control, the control unit 10 stores and holds information on the azimuth angle α and the elevation angle β that were set at the end of the automatic vehicle external rotation control or the manual vehicle external rotation control in the storage unit 14.

When the control unit 10 detects the above-described operation while performing automatic vehicle internal rotation control or manual vehicle internal rotation control, the control unit 10 stores and holds the information on the azimuth angle α that was set at the end of the automatic vehicle internal rotation control or the manual vehicle internal rotation control in the storage unit 14.

When the control unit 10 detects a switching operation from the other screen to the screen displaying the composite image, the control unit 10 starts automatic vehicle external rotation control. In the automatic vehicle external rotation control, the control unit 10 inherits the azimuth angle α and elevation angle β held as setting information when transitioning to the other screen, and sets the vehicle external viewpoint V1 at the position determined by the azimuth angle α and elevation angle β, and then from the inherited value, the azimuth angle α is changed, such that the control unit 10 rotates and displays the composite image 20.

The control unit 10, triggered by the detection of the operation to start the vehicle 1, deletes all the setting information held in the storage unit 14 as described above.

Effects of Embodiment

As described above, according to the vehicle 1, the transmittance of the vehicle image 22 is changed depending on whether automatic vehicle external rotation control is performed or manual vehicle external rotation control is performed, so appropriate display can be executed according to the purpose of the user of the vehicle 1, and the user can accurately recognize the situation around the vehicle 1. When automatic vehicle external rotation control is performed, the transmittance of the vehicle image 22 becomes high, so that the surroundings of the vehicle 1 can be seen over a wide range through the vehicle image 22. Accordingly, the user can quickly find a location around the vehicle 1 that the user wants to carefully check. On the other hand, when manual vehicle external rotation control is being performed, the transmittance of the vehicle image 22 becomes low. When the virtual viewpoint is determined according to user's operation, it is a situation in which the user wants to carefully check a specific location around the vehicle 1. In such situation, since the transmittance of the vehicle image 22 becomes low, it is possible to accurately grasp a positional relationship between the specific location and the vehicle 1.

Although one embodiment of the present disclosure is described above with reference to the accompanying drawings, it is obvious that the present disclosure is not limited to the embodiment. It is clear that those skilled in the art can suggest various changed or modification examples within the scope of the claims, and it is understood that the changed or modification examples also naturally fall within the technical scope of the present disclosure. Each component in the embodiment described above may be freely combined without departing from the spirit of the disclosure.

Modification Example

For example, the control unit 10 may change the transmittance of the vehicle image 32 in the composite image 30 depending on whether automatic vehicle internal rotation control is performed or manual vehicle internal rotation control is performed. For example, by making the transmittance of the vehicle image 32 when performing automatic vehicle internal rotation control higher than the transmittance of the vehicle image 32 when performing manual vehicle internal rotation control, while the composite image 30 is automatically rotating, the surrounding situation of the vehicle 1 can be easily grasped through the vehicle image 32. When the composite image 30 is manually rotated, the vehicle image 32 can be easily recognized, making it easier to understand the positional relationship between the vehicle 1 and surrounding objects. Even then, it is preferable for the transmittance of the vehicle image 32 to be set higher than the transmittance of the vehicle image 22 when manual vehicle external rotation control is performed.

In the embodiment described above, a four-wheeled automobile was illustrated as the vehicle, but the present invention is not limited thereto. The vehicle to which the technology of the present disclosure is applicable may be a two-wheeled vehicle (so-called motorcycle), a Segway (registered trademark), or the like.

The specification describes at least the following matters. Although components corresponding to those in the above-described embodiment are shown in parentheses, the present invention is not limited thereto.

(1) An Image Processing Device Including:

a processor (control unit 10) configured to generate a surrounding image (surrounding image 21, 31) that is an image of surroundings of a vehicle (vehicle 1) when the vehicle is viewed from a virtual viewpoint based on captured images obtained from an imaging device (imaging device 11) installed in the vehicle, generates a composite image (composite image 20, 30) in which a vehicle image (vehicle image 22, 32) showing the vehicle when viewed from the virtual viewpoint is combined with the surrounding image, and displays the composite image on a display device (display device 12), where the processor is configured to:

perform a first control (automatic rotation control) for displaying the composite image on the display device while rotationally moving the virtual viewpoint with respect to the vehicle in a predetermined pattern, and a second control (manual rotation control) for displaying the composite image on the display device while moving the virtual viewpoint to a position according to an operation of an operation unit (operation unit 13) of the vehicle; and change a transmittance of the vehicle image when performing the first control and when performing the second control.

According to (1), the transmittance of the vehicle image changes depending on whether the first control is performed or the second control is performed, so appropriate display can be executed according to the purpose of a user of the vehicle, and the user can accurately recognize a surrounding situation of the vehicle.

(2) The Image Processing Device According to (1), where the processor is configured to set the transmittance of the vehicle image to be higher than when performing the second control when performing the first control.

According to (2), when the virtual viewpoint moves in a predetermined pattern without user operation, the transmittance of the vehicle image increases, so the user can see a wide area around the vehicle through the vehicle image. Accordingly, the user can quickly find a location around the vehicle that the user wants to carefully check. On the other hand, when the position of the virtual viewpoint is determined by the operation of the operation unit, that is, by the user's intention, the transmittance of the vehicle image becomes low. When the virtual viewpoint is determined in response the user operation, it is a situation in which the user wants to carefully check a specific location around the vehicle. In such situation, the transmittance of the vehicle image becomes low, making it possible to accurately grasp a positional relationship between that specific location and the vehicle.

(3) The Image Processing Device According to (2), where the virtual viewpoint includes a first virtual viewpoint (vehicle external viewpoint V1) outside the vehicle and a second virtual viewpoint (vehicle internal viewpoint V2) inside the vehicle, and the processor is configured to set the transmittance of the vehicle image in the first control (automatic vehicle external rotation control) in which the virtual viewpoint is the first virtual viewpoint to be higher than the transmittance of the vehicle image in the second control (manual vehicle external rotation control) in which the virtual viewpoint is the first virtual viewpoint.

According to (3), when displaying a composite image that corresponds to the view of the vehicle from outside, by increasing the transmittance of the vehicle image during the first control, the situation around the vehicle can be easily confirmed through the vehicle image. During the second control, the transmittance of the vehicle image becomes low, so that the positional relationship between the place the user wants to see and the vehicle can be accurately grasped.

(4) The Image Processing Device According to (3), where the processor is configured to set the transmittance of the vehicle image in the first control (automatic vehicle internal rotation control) in which the virtual viewpoint is the second virtual viewpoint and the transmittance of the vehicle image in the second control (manual vehicle internal rotation control) in which the virtual viewpoint is the second virtual viewpoint to be higher than the transmittance of the vehicle image in the second control (manual vehicle external rotation control) in which the virtual viewpoint is the first virtual viewpoint.

According to (4), when displaying a composite image that corresponds to the view from inside the vehicle to the outside, regardless of whether the first control or the second control is performed, the transmittance of the vehicle image is high, so the situation around the vehicle can be easily confirmed through the vehicle image.

(5) The Image Processing Device According to any One of (1) to (4), where the virtual viewpoint is set at a position where a direction in which a straight line connecting a reference point (reference point P) set on the vehicle and the virtual viewpoint extends does not match a height direction of the vehicle.

(6) The Image Processing Device According to any One of (1) to (4), where the processor is configured to start the first control using detection of an operation to fix the vehicle as a trigger.

According to (6), when the user performs an operation to fix the vehicle, the composite image starts to be displayed automatically, so the user can accurately grasp the surrounding situation of the vehicle before getting off the vehicle, which can be useful for safety management.

(7) The Image Processing Device According to any One of (1) to (4), where the processor is configured to hold information on a position of the virtual viewpoint that is last set in the second control when the second control ends, and the processor is configured to start moving the virtual viewpoint from a position based on the information held at the end of the second control when switching from the second control to the first control.

According to (7), when switching from the second control to the first control, movement of the virtual viewpoint is started from the virtual viewpoint moved by the user's operation. That is, since the display update of the composite image starts from the composite image that the user last checked, it is possible to prevent the composite image from changing rapidly and to check the surroundings of the vehicle without feeling uncomfortable.

(8) The Image Processing Device According to (7), where the processor is configured to delete the held information using detection of an operation to start the vehicle as a trigger.

According to (8), after the information is held, the information is continued to be held until the power of the vehicle is turned off. Therefore, for example, even when the second control is started, another operation is performed, the second control ends, and then the second control is restarted or the first control is started, the composite image can be displayed from a state at the end of the second control, so convenience can be improved.

The invention claimed is:

1. An image processing device comprising:

a processor configured to generate a surrounding image that is an image of surroundings of a vehicle when the vehicle is viewed from a virtual viewpoint, based on captured images obtained from an imaging device installed in the vehicle, generate a composite image in which a vehicle image showing the vehicle when viewed from the virtual viewpoint is combined with the surrounding image, and display the composite image on a display device, wherein the processor is configured to:

perform an automatic rotation control for displaying the composite image on the display device while automatically and rotationally moving the virtual viewpoint with respect to the vehicle in a predetermined pattern, and a manual rotation control for displaying the composite image on the display device while manually and rotationally moving the virtual viewpoint in response to a rotation operation from a user of the vehicle to an operation unit of the vehicle; and set a transmittance of the vehicle image to be higher when performing the automatic rotation control, as compared to when performing the manual rotation control.

2. The image processing device according to claim 1, wherein the virtual viewpoint includes a first virtual viewpoint outside the vehicle and a second virtual viewpoint inside the vehicle, the processor is configured to set the transmittance of the vehicle image in the automatic rotation control in which the virtual viewpoint is the first virtual viewpoint to be higher than the transmittance of the vehicle image in the manual rotation control in which the virtual viewpoint is the first virtual viewpoint, and the processor is configured to set the transmittance of the vehicle image in the automatic rotation control in which the virtual viewpoint is the second virtual viewpoint to be higher than the transmittance of the vehicle image in the manual rotation control in which the virtual viewpoint is the second virtual viewpoint.

3. The image processing device according to claim 2, wherein the processor is configured to set the transmittance of the vehicle image in the automatic rotation control in which the virtual viewpoint is the second virtual viewpoint and the transmittance of the vehicle image in the manual rotation control in which the virtual viewpoint is the second virtual viewpoint to be higher than the transmittance of the vehicle image in the manual rotation control in which the virtual viewpoint is the first virtual viewpoint.

4. The image processing device according to claim 1, wherein the virtual viewpoint is set at a position where a direction in which a straight line connecting a reference point set on the vehicle and the virtual viewpoint extends does not match a height direction of the vehicle.

5. The image processing device according to claim 1, wherein the processor is configured to start the automatic rotation control using detection of an operation to fix the vehicle as a trigger.

6. The image processing device according to claim 1, wherein the processor is configured to hold information on a position of the virtual viewpoint that is last set in the manual rotation control when the manual rotation control ends, and the processor is configured to start moving the virtual viewpoint from a position based on the information held at the end of the manual rotation control when switching from the manual rotation control to the first automatic rotation control.

7. The image processing device according to claim 6, wherein the processor is configured to delete the held information using detection of an operation to start the vehicle as a trigger.

* * * * *